(No Model.)
E. BURKE.
SUBSTITUTE FOR CRANK MOTION.
No. 286,900. Patented Oct. 16, 1883.
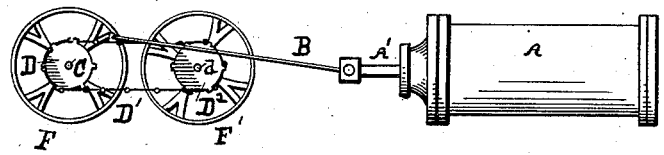
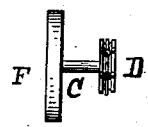
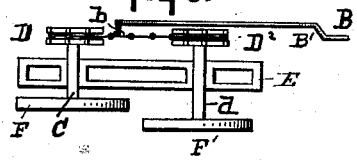
WITNESSES
INVENTOR
Attorney

UNITED STATES PATENT OFFICE.

EDWARD BURKE, OF BERNARD, IOWA.

SUBSTITUTE FOR CRANK-MOTION.

SPECIFICATION forming part of Letters Patent No. 286,900, dated October 16, 1883.

Application filed March 20, 1883. (No model.)

*To all whom it may concern:*

Be it known that I, EDWARD BURKE, of Bernard, county of Dubuque, State of Iowa, have invented a new and useful Improvement in Substitutes for Crank-Motion; and I declare the following to be a full, clear, and exact description of the same, such as will enable others skilled in the art to which it pertains to make and use it, reference being had to the accompanying drawings, which form a part of this specification.

My invention consists in the combination of devices and appliances hereinafter specified, and more particularly pointed out in the claims.

In the drawings, Figure 1 is a side elevation of a device embodying my invention. Fig. 2 is an end elevation. Fig. 3 is a plan view.

The object of my invention is to provide improved mechanism for transmitting power from a pitman-rod and analogous devices to a rotary shaft, the same forming a substitute for the crank-motion in ordinary use, and adapted to convert a reciprocating to a rotary motion, and vice versa.

My invention is particularly designed as an improvement upon that described in an application for an improvement in substitute for crank-motion filed by me in the Patent Office February 24, 1883, Serial No. 86,101, allowed March 8, 1883.

The improvement consists, essentially, in means for dispensing with the necessity of crossing or twisting the cable, whereby power is communicated from the pitman to the pulley, and also by the employment of a link or other suitable belt passing over suitable engaging pulleys, whereby a firmer grip may be secured upon the belt and increased strength given to the device. Moreover, by the employment of two pulleys instead of one, as in the former device, the length of stroke is governed by the distance at which the two pulleys are located from each other, instead of by the length of the longitudinal shoulder on the end of the pitman-rod. I accomplish these results as follows:

A is the cylinder of an ordinary engine. A' is the piston-rod. B is the pitman. C is the shaft.

In my improved device I prefer to construct the end of the pitman adjacent to the shaft with an arm, $b$. D is a pulley on the end of the shaft, constructed for carrying either a link or other suitable belt, D'. $D^2$ is an additional pulley, similar to pulley D, secured upon the axis $d$, the axis being secured to any suitable object—as, for instance, to the bed E. The distance at which the two pulleys D and $D^2$ should be located from each other is governed by the length of stroke of the piston. I construct the pitman-rod also with a suitable recess, B', whereby the pitman may operate freely, and continuously travel with the belt in its movement around the pulleys D and $D^2$. The arm $b$ is connected in any suitable manner with the belt at any desired point. The construction of the pitman should be such that the point of connection of the arm $b$ with the belt will be on a line with the opposite end of the pitman-rod or piston.

F and F' represent band, drive, or fly wheels, one or more of which may be suitably connected with line-shafting. One or more of these band, drive, or fly wheels may be directly connected with the pulleys and the machinery to be run; but while it would be advantageous in certain circumstances to employ both band or fly wheels, I would have it understood that my invention is designed to cover one or more of said wheels. It is also obvious that more than two pulleys, D and $D^2$, may be employed. I would have it understood that I do not limit myself to the use of only two of said pulleys. Moreover, as in the device referred to, any desired length of stroke may be obtained without throwing the pitman-rod very much out of line, the travel of the arm $b$ being thrown vertically out of line only half the diameter of the pulleys. By this method of construction any desired amount of power can be obtained.

What I claim is—

1. A device for converting reciprocating into a rotary motion, and vice versa, consisting of the combination of two or more shafts provided with pulleys, of a link or other belt connecting said pulleys, and a pitman-connection to said belt, the construction being such that the end of the pitman will continuously travel with the belt in its movement around the pulleys and communicate its power thereto, substantially as described.

2. A device for converting reciprocating into a rotary motion, and vice versa, consisting of the combination, with two or more shafts, either or both provided with a fly, drive, or band wheel, of pulleys connected by a link or other belt, a pitman provided with an arm, *b*, secured to said belt, substantially as described, whereby the end of the pitman during the stroke of the same will continuously move along with the belt around the pulleys and impart motion thereto, as set forth.

In testimony whereof I sign this specification in the presence of two witnesses.

EDWARD BURKE.

Witnesses:
N. S. WRIGHT,
W. F. FORD.